United States Patent
Raeber

[15] 3,651,331
[45] Mar. 21, 1972

[54] CONTROL INSTALLATION FOR A HYDRO-ELECTRIC POWER STATION

[72] Inventor: Victor Raeber, Vevey, Switzerland

[73] Assignee: Ateliers de Constructions Mecaniques de Verey S.A., Vevey, Vaud, Switzerland

[22] Filed: Mar. 2, 1970

[21] Appl. No.: 15,622

[30] Foreign Application Priority Data

Mar. 25, 1969 Switzerland ..........................4548/69

[52] U.S. Cl. ................................307/84, 290/414, 307/57
[51] Int. Cl. .........................................................H02j 3/46
[58] Field of Search........................307/84, 57; 290/4 A, 40

[56] References Cited

UNITED STATES PATENTS

| | | | |
|---|---|---|---|
| 2,392,426 | 1/1946 | Stivender | 307/84 |
| 2,072,784 | 3/1937 | Wingo | 307/84 |
| 2,636,132 | 4/1953 | Stineman | 307/84 X |
| 2,643,345 | 6/1953 | Almstrom et al. | 290/4 A |
| 2,754,429 | 7/1956 | Phillips | 290/4 A X |
| 2,790,090 | 4/1957 | Hinde et al. | 290/4 A |
| 2,872,591 | 2/1959 | Stineman | 307/84 |
| 3,156,828 | 11/1964 | Hopper et al. | 307/57 |
| 3,185,857 | 5/1965 | Johnson | 307/84 |
| 3,229,110 | 1/1966 | Kleinbach | 307/57 |
| 3,270,209 | 8/1966 | Cohn | 307/57 |
| 3,303,349 | 2/1967 | Sinclair et al. | 307/57 X |
| 3,321,638 | 5/1967 | Pratt | 307/84 X |
| 3,343,000 | 9/1967 | Bobo | 307/57 |
| 3,387,121 | 6/1968 | Maczuzak | 307/57 X |
| 3,427,466 | 2/1969 | Gogia et al. | 307/57 |

Primary Examiner—Robert K. Schaefer
Assistant Examiner—William J. Smith
Attorney—Emory L. Groff and Emory L. Groff, Jr.

[57] ABSTRACT

A control installation for a hydro-electric power station comprises slow-action integrated means for controlling the power outputs of each of a plurality of turbines to bring them to desired values and for equalizing the desired values, and a direct-action regulator which acts without substantial dephasing on output-adjusting members of the turbines.

5 Claims, 1 Drawing Figure

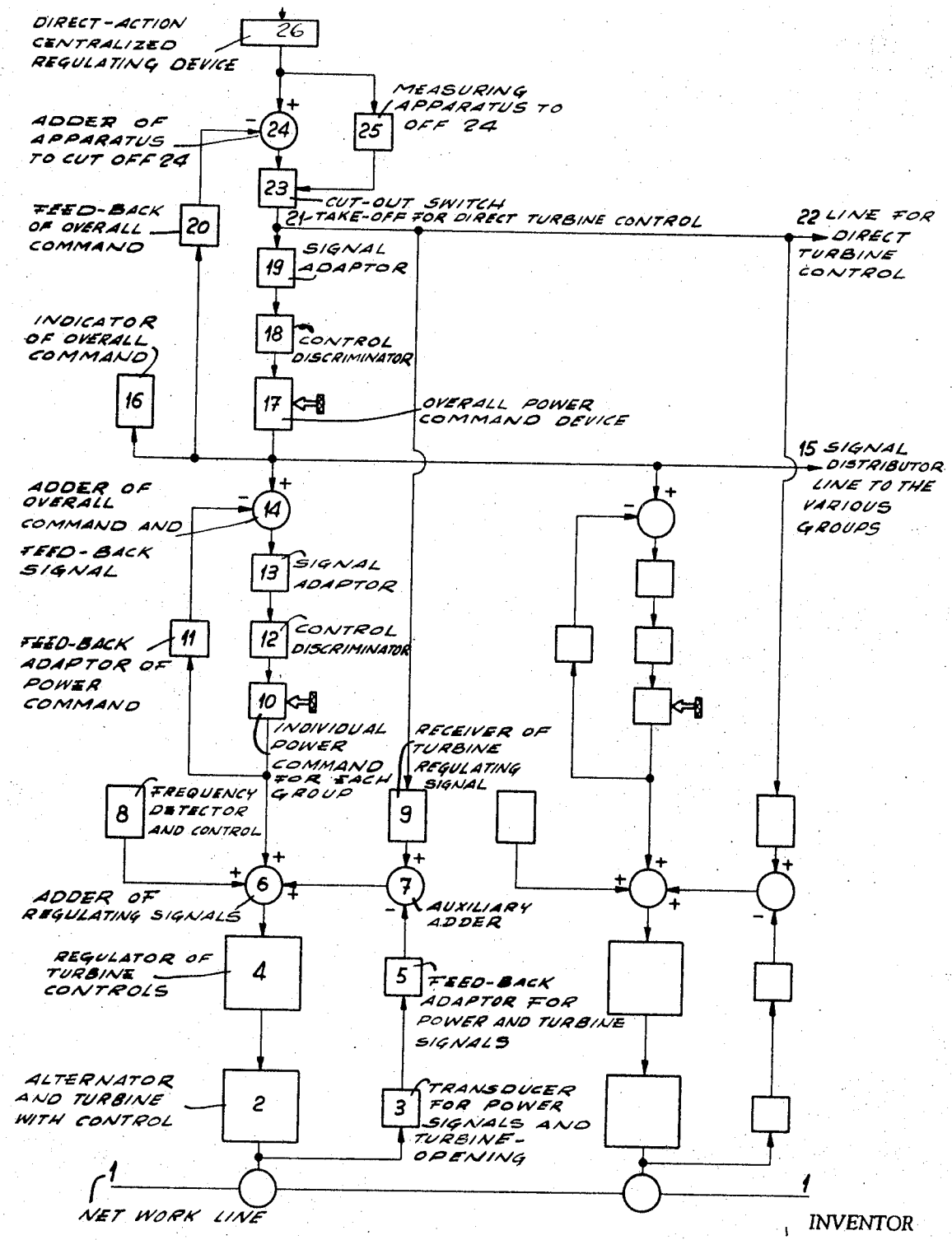

CONTROL INSTALLATION FOR A HYDRO-ELECTRIC POWER STATION

This invention relates to hydro-electric power stations and is particularly concerned with control installations therefor.

The power output of certain hydro-electric power stations can at any moment and practically instantaneously be modified according to the demand. This is not the case for other hydro-electric, thermic and nuclear power stations the control of which is far less supple and the power output more or less constant.

Various networks or grids which may be interconnected to a large degree are employed to distribute electricity supplied by one or more power stations of different types, and with varying degrees of flexibility in the control thereof. Since, on the one hand, electrical power consumption varies according to the hour of the day and, on the other hand, certain power stations have a constant output and cannot be adjusted to the variations in demand, the power stations of which the output is adjustable are used to produce a complementary and variable fraction of the total power necessary at each moment.

In order to control the various installations supplying electrical energy to a large network, the networks are often provided with network regulators directly controlling the output of at least a part of the installations. These regulators superimpose their action to that of turbine regulators the effect of which is zero most of the time, because the frequency of the network is normally correct. The action of turbine regulators alone is not adequate because the power is distributed between the various installations according to constant static laws establishing a relationship between the power and frequency for each turbine. However, the distribution of power could often conveniently be modified according to other considerations. In the summary hereinabove, it has been assumed that the frequency of the network is correct, thus allowing the effects of various tachometers and accelerometers with which the installations are equipped to be ignored.

Known network regulators can be classed into two principal groups according to the mode of operation thereof.

The first group of network regulators comprises apparatus which operate in the manner of a center which, aware of the probable power consumption at each moment, calculates what each power station must supply according to its own capacity and characteristics, in such a manner that the entire demand is satisfied. Considerations of economics, energy transfer, the season, and supply from or to other networks, all cooperate in the choice of the distribution of power in order to achieve the sought-for optimum.

This type of regulation, put into practice with a calculating and distributing center, has a foreseeable character, i.e., all of the factors are known or are calculable in advance. The orders to be transmitted to the various installations and machines of the network are often converted into electrical values, for example a voltage proportional to the foreseen power.

The second group of network regulators comprises apparatus which at each moment measures various values such as the frequency phase, power, energy and so on, and establish regulating signals as a function of one or more of the values measured. These signals are also often converted into an electrical voltage which is supplied to the regulators of the installations having a great flexibility of regulation and which react as near instantaneously as is possible to the various orders. This second regulating means computes the difference at each instant between the distribution of power foreseen by the calculating and dispatching center and the actual power that is necessary to meet the demand, taking into account numerous factors concerning the networks and notably the various electrical interconnection and distribution paths possible, none of which must ever be overloaded. Whilst the second regulating signal must intervene immediately, the same is not true for the first signal which, because of its calculable character, does not necessitate the same rapidity.

Known regulating apparatus of the first type often act in a given power station on a generalized control device constituting an overall power command device which sets up a regulating signal which is distributed to all of the groups made to depend upon the power station in question. This signal actuates the appropriate device of each regulator in such a manner that the power delivered by each turbine is made equal and so that the total power of all the turbines is exactly equal to the power that the station must supply. This type of regulating loop has low-speed action because charge take-up devices are involved.

The second regulating means, however, acts much more rapidly. In the case of electrical regulators, this action takes place by the intermediary of amplifiers on the position of the distribution slide-valve piloting the servo-motor of the turbine sluicing.

It is an object of the present invention to provide a control installation for the groups of a power station provided with the two above-described types of control devices acting simultaneously.

The invention proposes a control installation for a hydro-electric power station comprising a plurality of groups each provided with a regulator for actuating the output adjustment members of a turbine, each regulator being controlled by an individual power command device which can emit a first signal for regulation of the desired individual power output of a turbine, said first signal acting on the regulator such that the power delivered by the turbine tends to become equal to a desired power, the installation additionally comprising an overall power command device which can emit a second signal as a function of the desired overall power to be supplied by the installation, said second signal acting on all of the individual power command devices of the regulators of the groups depending thereupon in such a manner that the first signals emitted by these devices cause the power supplied by each turbine to become equal with one another, the control installation further comprising a direct-action regulating device which can emit a third signal acting without substantial dephasing on a distribution slide-valve of the control of a servo-motor of each turbine dependent thereupon.

The accompanying drawing shows, schematically and by way of example, an embodiment of the invention.

The single FIGURE is a schematic block diagram of various regulating members having an operative role, designated by the following reference numerals:

1 - part of a network;

2 - a hydro-electric group comprising an alternator, and a turbine with sluicing servo-motor;

3 - a wattmetric transducer and opening variometer delivering respectively power signals and turbine-opening signals;

4 - a regulator comprising an assembly of regulating members, such as amplifiers and the distribution slide-valve of the sluicing of the servo-motor of the turbine, without including this servo-motor itself;

5 - a feed-back adapter adjusting the power and turbine-opening signals respectively;

6 - an adder for the regulator input for adding various regulating signals;

7 - an auxiliary adder;

8 - an assembly of apparatus for detecting the frequency and possibly derivatives thereof and setting up a frequency regulating signal; as has been stated above, this assembly does not play a part in the described processes, the frequency of the network being considered as constant and at a standard value;

9 - an adapter enabling the introduction of a regulating signal to act directly on the sluicing of the turbine;

10 - an individual power command device (hereinafter referred to as "individual command") of the group or opening respectively and delivering a desired power or individual opening signal respectively. The distinction between "power" and "opening" comes from the various possible feed-back means. In practice the turbine can be monitored by the opening, the power delivered thereby being a function of the degree of opening but also of the water supply, the variations in which can be substantial. To avoid this drawback, it is possible to provide wattmetric transducers measuring the electrical power output of the machine and setting up a signal in proportion thereto; this is the case of monitoring by power;

11 - a feed-back adapter of the individual command of the group;

12 - a control discriminator for the individual command of the group;

13 - a signal adapter for controlling the individual command of the group;

14 - an adder (and subtractor) for computing the difference between the signal from the overall command (17) and the feed-back signal of the individual command of the group;

15 - a distributor line for distributing a signal from the overall command to the various groups;

16 - an instrument for measuring a signal from the overall command;

17 - an overall power command device for the installation (herein referred to as "overall command");

18 - a control discriminator for the overall command;

19 - an adapter for the signals controlling the overall command;

20 - an adapter for a feed-back signal of the overall command;

21 - a take-off for a direct-action regulating signal on the sluicing of the turbine;

22 - a distributor line for distributing a direct-action regulating signal on the sluicing of the turbine 2 and other turbines of the power station;

23 - a cut-out switch;

24 - an adder (and subtractor) for computing the difference between the centralized direct-action regulating signal and the feed-back signal of the overall command;

25 - a measuring apparatus fed by a centralized regulating signal causing, by switch 23, cutting of the signal from the adder 24, for example upon breakdown of the assembly of centralized regulating apparatus; and 26 - a direct-action centralized regulating device which can emit a signal as a function of the power which must be supplied by the station.

The individual command 10 of the first group emits a signal to the adder 6 of the regulator. This signal is proportional to the desired power which the machine must supply. The adapter block 9 is for input into the regulator of each turbine of external orders from a centralized quick-action regulating apparatus. The adapter 9 emits a signal which, for example, is a DC voltage proportional to the power that the machine must supply. Similarly, the individual command 10 gives a signal of the same type as the adapter 9. These two signals are added by the combined action of the adders 6 and 7 and constitute a totalized signal of the order of power and that arrives on the members 4 and 2 to instantaneously control the movements of the sluicing of the turbine. The feed-back signal passing through and adapted by the members 3 and 5 is taken off the totalized signal of the order of power. The adjustment of the sluicing automatically stops when the signal from the adder 6 is zero, i.e., when the power supplied by the turbine equals the sum of the power orders given by the individual command and the centralized regulating apparatus 26, 9.

The action of the individual command is an integrated action, since in general it comprises an electric motor turnable in the two directions, the angular position of the rotor which represents the sum of all of the orders received. This rotor drives a potentiometer and/or variometer respectively giving a voltage as a function of its position. By its own nature, the action of this device is slow. The speed of action is constant and independent of the amplitude of the order given. The duration of its action, however, depends on this amplitude. These apparatus generally complete their functional path, enabling transfer from full power to zero, in a time of between 30 and 60 seconds. The speed of action of the direct-action regulating signal passing by the adapter 9 is, in contrast, apart from large-amplitude orders which cause saturation phenomena, proportional to the amplitude of the order.

It is already known to use a supplementary regulating loop constituted by the elements 11 to 17 which pilot the operation of each individual command 10 of the groups dependent thereupon. It is, for various reasons and notably because of the output, advantageous to make these groups work in such a manner that they each produce an equal power. The overall command 17 enables this to be achieved. It comprises a member which emits a signal, for example in the form of an electrical voltage, the value of which is proportional to the position occupied by the rotor of the overall command, the construction of which can be similar to that of the previously described individual command. The value of this voltage can be read by an observer by means of the measuring apparatus 16. The voltage is additionally distributed to the various groups of the station through line 15. This voltage acts as a regulating signal delivered to the regulating circuit of each group through an adder 14. After amplification and adaptation in the adapter 13, it is passed through discriminator 12. This latter measures the signal in size (amplitude) and sign ( + or − ). If the signal is of a greater positive value than a certain basic value, it causes operation of the motor of the individual command 10 in a certain direction and conversely, if it is more negative than a certain negative value, it causes operation in the other direction. If the signal is too small, i.e., contained within a certain tolerance range, there is no action. The output signal from each individual command 10 is, on the one hand, delivered directly into regulator 6 to cause changes in power and, on the other hand, fed back to adder 14 through adapter 11. In this adder it is opposed to the signal from the overall command 17. When the difference between the signal from command 17 and the feed-back signal of each individual command 10 is zero, the latter command devices remain idle.

In other words, since the devices 10 to 14 of each group are similar and the signal supplied by the overall command 17 is equal for all of the groups, each turbine is regulated to produce the same power.

The complementary installation enabling the effects of the two types of network regulators to be combined, i.e., the calculating and dispatching center regulator and the direct-action type regulator, comprises the elements 18 to 26. The operation of this assembly is as follows:

When the centralized regulating device 26 emits a regulating signal, this signal passes through the adder 24 and cut-out switch 23 where it is taken off at 21 and distributed by line 22 to all of the groups of the station depending on this device and which it controls by "direct-action," inputting through the adapter 9 each regulator. In parallel, this regulating signal controls the overall command 17. This control takes place in the same manner as that of the individual command, elements 10, 11, 12, 13 and 14 corresponding respectively to elements 17, 20, 18, 19, and 24.

This third regulating signal is adapted by adapter 19 which sends it into the discriminator 18 which selects it. The simplest type of selection comprises three cases. If the amplified signal is too small ( + or − ), the discriminator stops the signal and command 17 remains inoperative. If the signal is greater than a given value, the discriminator causes operation of the overall command in a direction tending, for example, to increase the power produced by the station, and the converse if the signal is more negative than a certain negative value.

A feed-back adapter device 20 takes up the output signal, adapts it and feeds it back to the adder 24 where it is opposed to the incoming signal. When the fed-back signal is of equal value to the order signal from central regulator 26, but of opposite sign, their sum is zero and the overall command remains inoperative.

Suppose, for example, that the direct-action regulating device suddenly emits an order to increase the power. This order passes through adder 24 and is distributed by the take-up 21, directly to the regulators through the inputs of adapters 9. Each regulator receives a like order and reacts substantially in the same manner. This first action is extremely rapid, the power of the station increasing according to the order received. At the same time, this order influences the overall command 17 in the same way, this command in turn influencing each group which has, because of this, a tendency to over-open the sluiceage dependent thereon. This action is slow. The feed-back adapter 20 taking up the signal emitted by the overall command 17, feeds it back with a reversed sign to the adder 24, decreases the signal from the adder, this decrease having a direct effect on the rapid-action regulation adapters 9 and causing a closing-up of the turbines to compensate for the over-opening thereof. The effect of the overall command 17 continues as long as sufficient regulating order exists. The effect is to progressively annul these orders, and when they are annulled, the system is in equilibrium, the station produces the power ordered by the centralized regulator and the direct-action regulating signals are cancelled.

The above assembly operates in the manner of a memory device. The rapid-action orders pass directly to the members which must be adjusted and at the same time by the slow-action overall command, acting on the individual commands of the groups. Consequently, if the rapid-action regulation device, which is often tele-controlled from a post distant from the station itself and situated in the heart of the electrical energy distribution network, breaks down and the regulating order suddenly disappears, a power station equipped with the described installation will undergo no disturbance because the group of orders are memorized.

The installation can be completed by a safety device notably comprising measuring apparatus 25, which measures the signal emitted by the centralized regulator 26 and controlling, if the signal falls below or above a normal value or values, the opening of a switch 23 which cuts the direct-action and integrated links. These machines remain regulated in the state that they occupied previously.

The centralized regulator which is often tele-controlled (or tele-adjusted) can receive orders of all types, either slow in the manner of orders from a calculating and dispatching center, or rapid coming from a network regulator, for example of the phase-energy type.

In connection with the block diagram, mention was made of control buttons acting on the command devices 10 and 17. These buttons enable manual intervention. Also, the installation can comprise means to enable the isolation of one or several groups or of a part of the control circuitry.

I claim:

1. A control installation for a hydro-electric power station comprising: a plurality of turbine groups with at least one output adjustment member for each turbine, a regulator for each of said output adjustment members, and individual power command device connected to each regulator to furnish a first signal for the regulation of the desired individual power output from its turbine; an overall power command device connected through a distributing line to all the individual power command devices, said overall power command device emitting a second signal as a function of the desired overall power to be supplied by the station, said second signal acting on all of the individual power command devices of the regulators of the groups depending thereupon in such a manner that the first signals emitted by these devices cause the power supplied by each turbine to become equal; and a direct-action regulating device connected by distributor lines directly to the regulators of the output adjustment member of each of a plurality of turbines dependent thereupon to act without substantial dephasing on said output adjustment members.

2. A control installation according to claim 1, wherein the output adjustment members of said turbines, upon which said direct-action regulating device acts, each comprise a distribution slide-valve of the control of a turbine servo-motor, said direct-action regulation device being able to act without substantial de-phasing on said distribution slide-valves.

3. A control installation according to claim 1, wherein said direct-action regulating device supplies a third regulating signal directly to said regulators through adapters and indirectly to said regulators of said output adjustment members by the integrated action of said overall and said individual power command devices, and comprising a feed-back device for feeding back with reversed sign said second signal from said overall power command device to reduce the value of said third signal.

4. A control installation according to claim 3, comprising means for measuring said third signal and means for cutting-out said third signal when the value thereof exceeds or falls below a certain value or values.

5. A control installation according to claim 3, comprising, for each turbine, means for feeding back with reversed sign to an auxiliary device an output signal from a turbine to reduce the direct-action third signal acting on that turbine.

* * * * *